United States Patent [19]

Maeda

[11] Patent Number: 4,543,660
[45] Date of Patent: Sep. 24, 1985

[54] PATTERN FEATURES EXTRACTING APPARATUS AND METHOD

[75] Inventor: Ken-ichi Maeda, Kamakura, Japan

[73] Assignee: Tokyo Shibaura Denki Kabushiki Kaisha, Kawasaki, Japan

[21] Appl. No.: 485,061

[22] Filed: Apr. 14, 1983

[30] Foreign Application Priority Data

Apr. 15, 1982 [JP] Japan ................................ 57-62964
Apr. 15, 1982 [JP] Japan ................................ 57-62969

[51] Int. Cl.$^4$ ............................................. G06K 9/64
[52] U.S. Cl. ...................................... 382/34; 382/27; 382/36; 382/41
[58] Field of Search .................... 382/25–28, 382/41–43, 36, 30, 34

[56] References Cited

U.S. PATENT DOCUMENTS

| | | | |
|---|---|---|---|
| 3,846,752 | 11/1974 | Nakano et al. | 382/28 |
| 3,906,446 | 9/1975 | Iijima et al. | 382/27 |
| 4,074,231 | 2/1978 | Yajima et al. | 382/50 |
| 4,319,221 | 3/1982 | Sakoe | 382/36 |

Primary Examiner—Leo H. Boudreau
Attorney, Agent, or Firm—Oblon, Fisher, Spivak, McClelland & Maier

[57] ABSTRACT

A plurality of different mask pattern data which are indicated by values obtained from Hermitte's polynomials of different degrees weighted by a Gaussian function are stored in mask memories, respectively. Each mask pattern data stored in each of the mask memories is convolved by a sum-of-product circuit together with unknown input pattern data. A plurality of extracted pattern feature data are stored in pattern feature memories.

11 Claims, 21 Drawing Figures

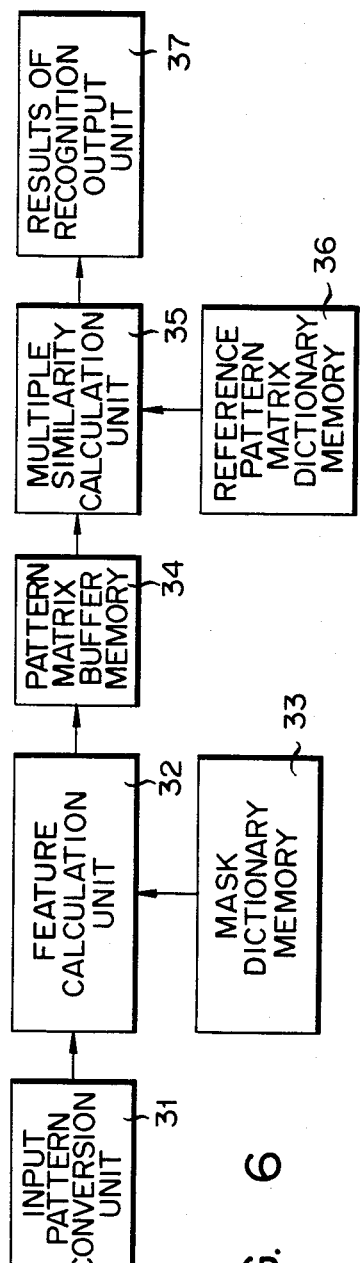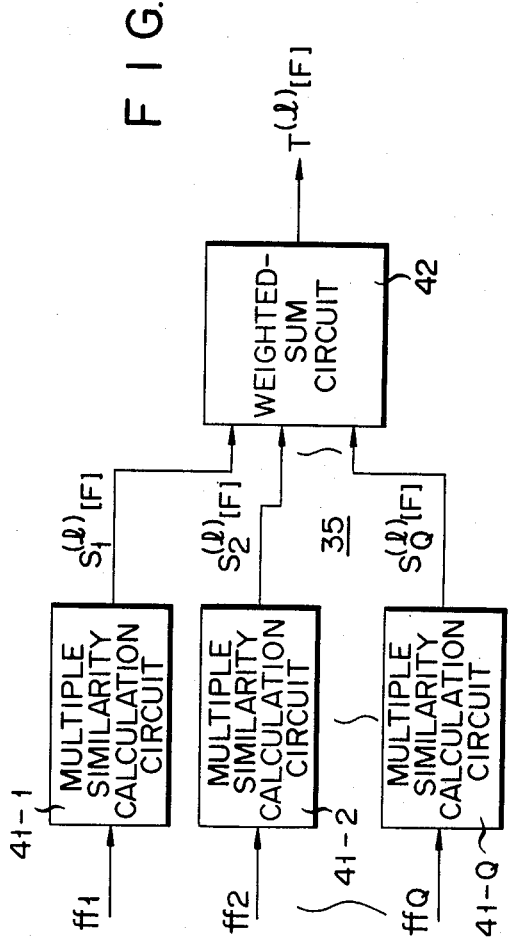

PATTERN FEATURES EXTRACTING APPARATUS AND METHOD

BACKGROUND OF THE INVENTION

The present invention relates to a pattern features extracting apparatus and method wherein similar patterns such as a pair of Kanji characters which are composed of a number of strokes, may be clearly distinguished from each other for pattern recognition.

Conventionally, a pattern recognition method is proposed wherein various pattern features are extracted from an unidentified or unknown pattern so as to recognize the unknown input pattern, and each extracted pattern feature is compared with each reference pattern feature so as to obtain a similarity measure therebetween, thereby determining as the input pattern a reference pattern having a highest similarity measure. The pattern features include a length, a slope, and an intersection between two lines and a corresponding angle of pattern elements. Furthermore, darkness (density) which corresponds to a set of pattern elements in a sub-area of the pattern is used as a pattern feature. However, these pattern features are not effective to recognize such complicated patterns which have many character strokes and may be similar to each other. For example, Kanji patterns as shown in FIG. 13 have substantially the same degree of darkness in the sub-areas of these characters, thus disabling high rate recognition. In particular, when these Kanji characters are written by hand, and thereby inevitably include many deformation components, successful recognition is almost impossible.

A method called as a multiple similarity method is described in U.S. Pat. No. 3,688,267. This method is very effective for pattern recognition when noise components such as stains or scratches are present. However, even if this method is applied to pattern recognition to Kanji characters, recognition cannot be successfully performed.

SUMMARY OF THE INVENTION

It is an object of the present invention to provide a pattern features extracting apparatus and method which may be suitably used for a character recognition apparatus to readily guarantee pattern recognition of a complicated pattern of a character such as Kanji character, it being impossible to proper recognize such a complicated pattern using conventional pattern features representing darkness of a sub-area of an unknown input pattern.

According to the present invention, a convolution device is used as a means for extracting pattern features from an unknown input pattern so as to perform a mask operation. The mask operation is performed by convolution using pattern element data of a given position of each of a plurality of sub-area patterns of an unknown input pattern and data representing values obtained from Hermite's polynomials weighted by a Gaussian function. A plurality of pattern feature data are extracted using a mask having a plurality of different patterns in accordance with the Hermite's polynomials. The extracted pattern feature data is obtained at corresponding positions of the unknown input pattern.

The obtained pattern feature data and their position data are arranged in a row-column matrix. By using the pattern matrix, each vector element indicating a pattern feature is compared with a reference pattern feature so as to obtain a multiple similarity, thereby recognizing the unknown input pattern.

BRIEF DESCRIPTION OF THE DRAWINGS

FIGS. 3A to 3D are respectively tables for explaining the storage contents of the mask memory used in the apparatus shown in FIG. 1;

FIG. 6 is a block diagram of a pattern recognition system employing the pattern feature extracting apparatus shown in FIG. 1;

FIG. 7 is a block diagram of a multiple similarity calculation unit shown in FIG. 6;

FIGS. 12A to 12D are tables showing the storage contents of the mask memory of the X-Y and X'-Y' orthogonal coordinates; and FIG. 13 shows an example Kanji characters which have substantially the same degree of darkness in the subareas thereof.

DETAILED DESCRIPTION OF THE PREFERRED EMBODIMENT

Figure 1:
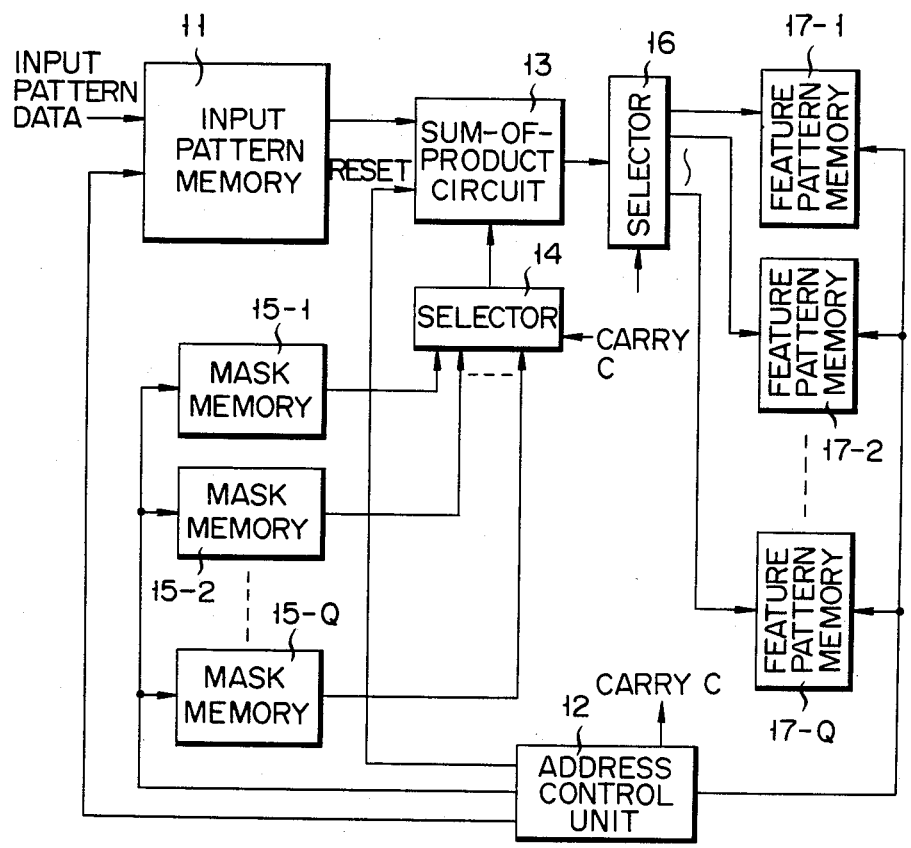
FIG. 1 is a block diagram of a pattern feature extracting apparatus according to an embodiment of the present invention.
Figure 2:
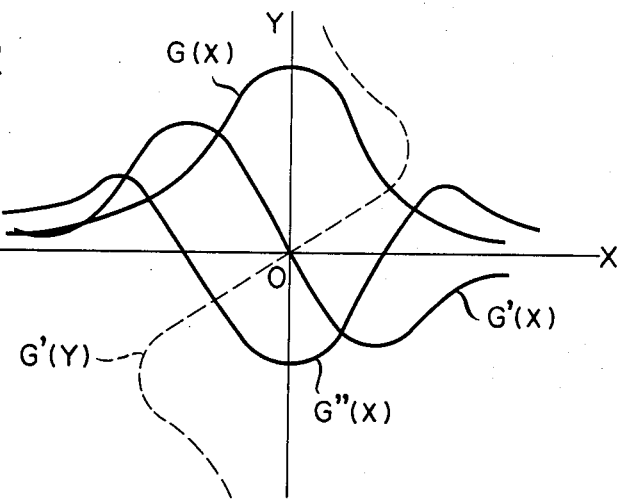
FIG. 2 is a graph for explaining the function of a mask memory.

An embodiment of the present invention will be described with reference to the accompanying drawings. Referring to FIG. 1, data of an unknown input pattern is stored in an input pattern memory 11 whose address is designated by an address control unit 12. The input pattern data stored in the input pattern memory 11 is then read out from an address accessed by the same address control unit 12. The readout data is then supplied to one input end of a sum-of-product circuit 13. Data selectively read out from a plurality of mask memories 15-1, 15-2, . . . , 15-Q through a selector 14 is supplied to the other input end of the sum-of-product circuit 13. The Q mask patterns are stored in the mask memories 15-1, 15-2, . . . , 15-Q. The mask patterns respectively comprise values which are obtained from Hermite's polynomials weighted by the Gaussian function. If the Gaussian function and the nth-degree Hermite's polynomial are defined as $G(x)$ and $H_n(x)$, respectively, a vector $\mathbb{B}$ of the nth mask pattern is given as follows:

$$\mathbb{B}_n(x) = G(x) \cdot H_n(x) \qquad (1)$$

where $n = 0, 1, 2, 3, \ldots$, and $\mathbb{B}_n$ is a discrete expression of $B_n(x)$. Equation (1) produces a value which is the nth derivative of the Gaussian function $G(x)$. As is well known, Hermite's polynomials $H_n(x)$ can be derived from the nth derivative of Gaussian function $G(x)$ such as $G^{(n)}(x) \rightarrow G(x) H_n(x)$. The Gaussian function $G(x)$ may be differentiated to obtain first and second differential functions G'(x) and G"(x). The Gaussian function G(x) and its differential functions G'(x) and G"(x) are plotted in the X-Y plane as illustrated in FIG. 2. As is well known, the curve of the Gaussian function G(x) indicates the Gaussian distribution as shown in FIG. 2. The weighting coefficients are distributed to establish the Gaussian distribution, thereby forming a single mask. The mask is used for blurring to extract darkness as one of the pattern features of the input pattern, as is disclosed in U.S. patent application Ser. No. 366,667; to Maeda; filed on 4-8-82; assigned to Tokyo shibaura Denki Kabusiki Kaisha.

Figures 3A, 3B:
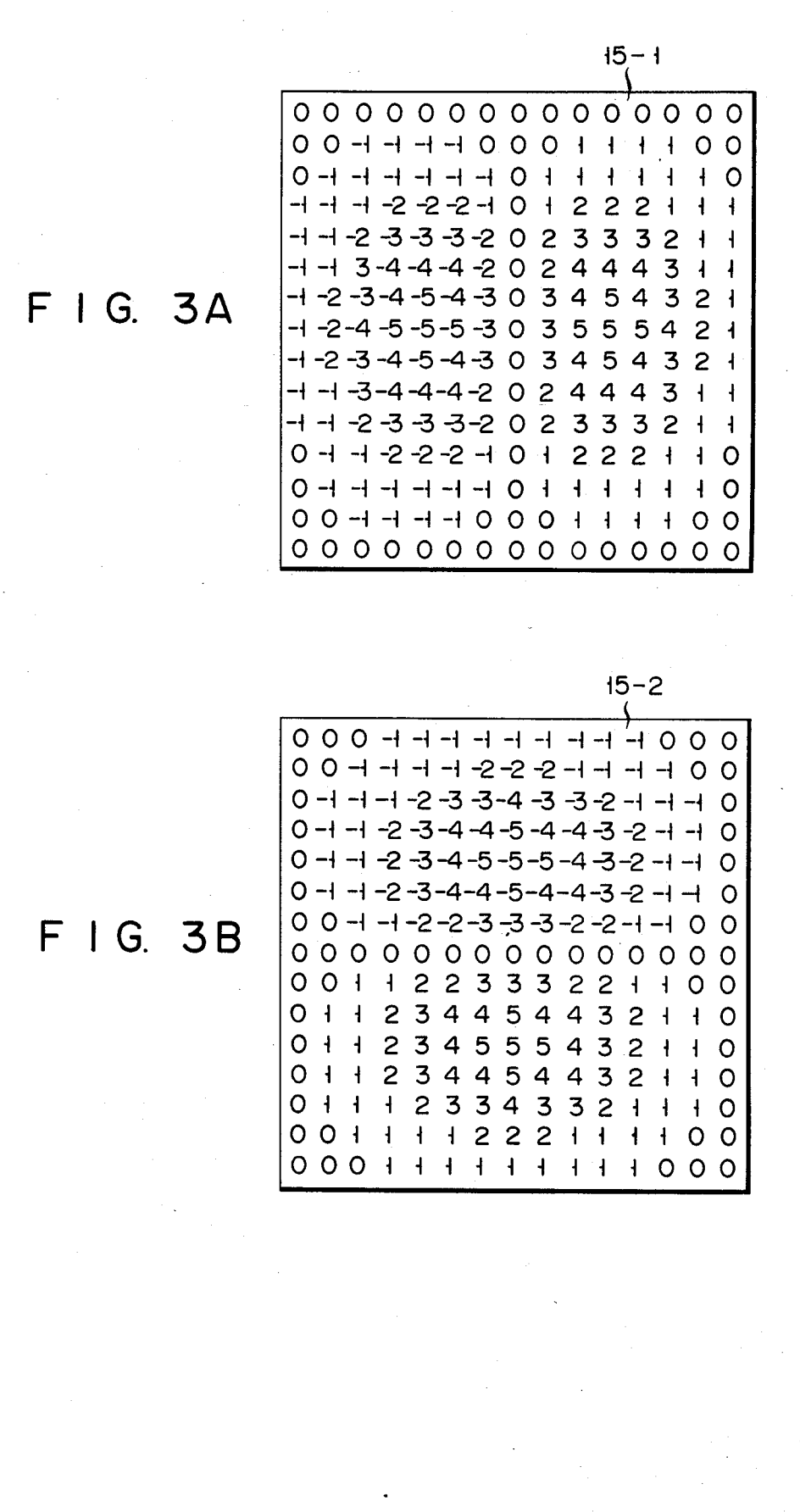
Figures 3C, 3D:
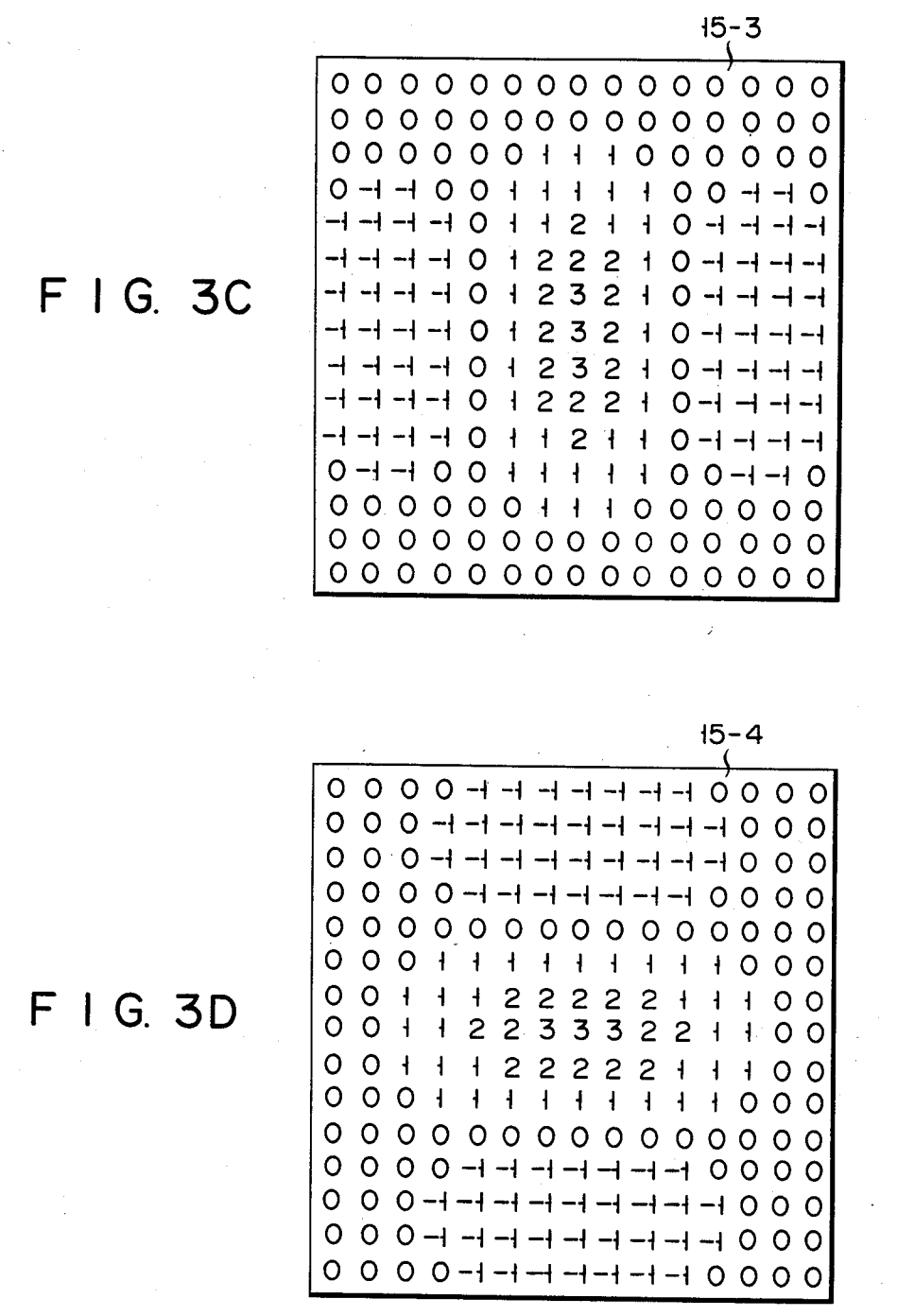

FIGS. 3A and 3B respectively show tables of mask patterns having weighting coefficient distributions in accordance with the curve obtained from a first-degree Hermite's polynomial which is weighted by the Gaussian function G(x) (i.e., a curve G'(x) as shown in FIG. 2). FIGS. 3C and 3D respectively show tables of mask patterns having weighting coefficient distributions in accordance with the curve obtained from a second-degree Hermite's polynomial which is weighted by the Gaussian function G(x) (i.e., a curve G"(x) of FIG. 2).

FIG. 3A shows a mask corresponding to an expression $-G(Y)G'(x)$ in which $G(x)$ is denoted in the direction of Y axis and $-G'(x)$ is denoted in the direction of X axis. FIG. 3B shows a mask corresponding to an expression $-G'(Y)G(x)$, where lower part of the Y axis is denoted as plus. FIG. 3C and FIG. 3D show masks corresponding to expressions $-G(Y)G"(x)$ and $-G"(Y)G(x)$, respectively.

A value $P^*_{m,n}(r, \tau)$ of a weighting coefficient of the matrix of 225 ($=15\times15$) points of each of the mask patterns shown in FIGS. 3A to 3D is given as follows:

$$P^*_{m,n}(r, \tau) = (1/(4\pi\tau))\exp(-\|r\|^2/(4\tau)) \quad (2)$$
$$\times 1/\sqrt{m!n!} \sqrt{\tau^{(m+n)}}$$
$$\times H_m(x/\sqrt{2\tau}) \cdot H_n(y/\sqrt{2\tau})$$

where r is given as $r=ix+jy$, i and j are the unit vectors and $\tau$ is the parameter concerning the convolution function to be described later, and $H_m$ and $H_n$ are Hermite's polynomials where nth-degree polynomials for x are given as follows:

$$H_n(x) = (-1)^n \exp(x^2/2) \times d^n/dx^n \exp(-x^2/2) \quad (3)$$

According to the mask patterns indicated by the values given by the Hermite's polynomials weighted by the Gaussian function, the function $P^*_{m,n}$ as the mask element has the following characteristics. First, subscripts m and n of the functions $H_m$ and $H_n$ indicate the degrees of polynomials and correspond to variations of the mask patterns, respectively. The value of each of the degrees of the functions $H_m$ and $H_n$ can be changed from "0" to any given number. Therefore, by using these mask patterns, complicated data (features) can be effectively extracted as needed. Second, the function $(P^*_{m,n})$ comprises an orthogonal function with respect to its factors m and n. Let an adjoined function $(P_{m,n})$ of the function $(P^*_{m,n})$ be defined as follows:

$$P_{m,n}(r, \tau) = (\sqrt{\tau^{(m+n)}}/\sqrt{m!n!}) \cdot H_n(x/\sqrt{2\tau}) \cdot H_m(y/\sqrt{2\tau}) \quad (4)$$

The inner product $(P^*_{m,n}, P_{m',n'})$ of the functions is given as follows:

$$(P^*_{m,n}, P_{m',n'}) = \int_{R_\infty} P^*_{m,n}(r, \tau) P_{m',n'}(r, \tau) dr \quad (5)$$

Here, if $\delta$ indicates Kronecker's delta, the inner product is written as follows:

$$(P^*_{m,n}, P_{m',n'}) = \delta_{mm'} \cdot \delta_{nn'} \quad (6)$$
$$\begin{cases} = 1 \text{ for } m = m' \text{ and } n = n' \\ = 0 \text{ for } m \neq m' \text{ or } n \neq n' \end{cases}$$

The above result indicates that the function $(P^*_{m,n})$ are mutually orthogonal. When mask processing is performed using these factors or elements, the features of the pattern can be extracted to be independent of each other without overlapping, thereby providing very effective extraction. Third, according to the function described above, if the elements (values) m and n are both "0", data of darkness (density) of the peripheral area of a given position in the input pattern can be extracted. Furthermore, if m=0 and n=2, then the feature value along the axis of abscissa can be obtained; if m=2 and n=0, then the feature value along the axis of ordinate can be obtained. The feature extracted along the axes of ordinate and abscissa may not be interpreted in accordance with a length. Even if the geometric data is disturbed by a noise element, data can be effectively extracted to a given extent. In fine, the features of an input pattern can be stably extracted irrespective of deformation or noise.

As described above, when pattern feature extraction is performed using the mask patterns which are indicated by the values obtained from Hermite's polynomials weighted by the Gaussian function, necessary data can be effectively extracted without overlapping. Furthermore, the data can be extracted irrespective of noise components.

Referring again to FIG. 1, the mask pattern data read out from the mask memories 15-1, . . . , and 15-Q are supplied to the sum-of-product circuit 13 through the selector 14. Each mask pattern data is subject to masking with the input data read out from the input pattern memory 11. According to this masking, mask data $P^*_{m,n}(r, \tau)$ read out from each of the mask memories 15-1, . . . and 15-Q is used to perform convolution for the unknown input pattern data g(r) as follows:

$$f_{m,n}(r, \tau) = \int_{R_\infty} g(r') \cdot P^*_{m,n}(r - r', \tau) dr' \quad (7)$$

Another pattern data $f_{m,n}(r, \tau)$ is thus obtained. A given pattern feature of the input pattern data g(r) is emphasized by masking, so that the pattern data $f_{m,n}(r, \tau)$ is produced at the output end of the sum-of-product circuit 13.

The pattern data $f_{m,n}(r, \tau)$ from the sum-of-product circuit 13 are respectively stored through a selector 16 in the pattern characteristic memories 17-1, 17-2, . . . , and 17-Q which are respectively arranged corresponding to the mask memories 15-1, 15-2, . . . , and 15-Q, where Q is a certain pair of m and n.

Figure 4:
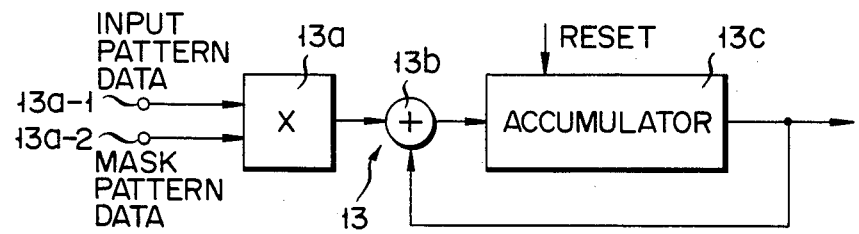
FIG. 4 is a block diagram showing a sum-of-product circuit shown in FIG. 1.

The detailed arrangement and operation of the sum-of-product circuit 13 and the address control unit 12 will now be described. The sum-of-product circuit 13 comprises a multiplier 13a, an adder 13b and an accumulator 13c, as shown in FIG. 4. Assume that the mask pattern stored in the mask memory 15-1 shown in FIG. 3A is used to extract one of the pattern features from an unknown input pattern.

225 input data corresponding to the 225 mask data stored in the mask memory 15-1 (FIG. 3A) are sequentially read out by the address control unit 12 from the start address from the memory 11. At the same time, the pattern feature data are read out in response to the address signals from the address control unit 12. More particularly, a start address $a_{1,1}$ of the memory 11 for storing y (row)$\times$x (column) data is accessed by the address control unit 12. Input data stored at the start address $a_{1,1}$ is read out and is supplied to an input end 13a-1 shown in FIG. 4. At the same time, a start address $b_{1,1}$ of the memory 15-1 for storing 15$\times$15 data is accessed by the address control unit 12, and mask data storted at the start address $b_{1,1}$ is read out and supplied to an input end 13a-2 shown in FIG. 4.

The two data respectively supplied to the input ends 13a-1 and 13a-2 are multiplied by the multiplier 13a, and a multiplied data is supplied to one input end of the adder 13b. An output from the accumulator 13c is fed back and supplied to the other input end of the adder 13b. An output from the adder 13b is stored in the accumulator 13c again.

Second addresses $a_{1,2}$ and $b_{1,2}$ of the memories 11 and 15-1, respectively, are accessed by the address control unit 12, and corresponding input pattern data and mask data are respectively read out therefrom. These data are then multiplied by the multiplier 13a. A multiplied data is added by the adder 13b to the previous multiplied data stored in the accumulator 13c. The sum data is then stored in the accumulator 13c. In the same manner, the 225 data at addresses up to an address $a_{15,15}$ and an address $b_{15,15}$ of the respective memories 11 and 15-1 are read out, and the sum-of-product data are then stored in the accumulator 13c. The sum-of-product operation using the 225 data read out from each of the memories 11 and 15-1 can be called convolution. According to this convolution, if data at the address $a_{8,8}$ (address at the 8th row and the 8th column) is centered, the point and the peripheral 224 pattern data are covered with the mask data stored in the mask memory 15-1, thereby producing pattern feature data corresponding to the address $a_{8,8}$ from the accumulator 13c. Therefore, the data stored in the accumulator 13c is stored in a corresponding memory area of the pattern feature memory 17-1 at an address such as $c_{8,8}$. If the dimension of the memory 11 is the same as that the memory 17-1, the address $c_{8,8}$ corresponds to the address $a_{8,8}$ and can be accessed by the address control unit 12. When the pattern feature data has been stored at the address $c_{8,8}$ the accumulator 13c is reset in response to a reset signal from the address control unit 12.

For example, the address $a_{8,8}$ corresponds to the position (8, 8) in a 100$\times$100 area of the memory 11. Let a virtual output area be 100$\times$100 of the memory 17-1. An actual memory area of the memory 17-1, however, may be only 86$\times$86 and the rest part is assumed all zero. $c_{8,8}$ is the position (8, 8) in the 100$\times$100 virtual area, the first cell in 86$\times$86 area of the respective memories 17-1, . . . , 17-Q.

Then, the address of the memory 11 which corresponds to the given position is shifted by one in the row direction so as to sequentially read out the 225 data at addresses $a_{1,2}$ to $a_{15, 16}$. If the memory 11 is larger than the memory 17-1, the address of the memory 11 may be shifted by a desired number more than one for designating an interlaced given position obtained by adding a constant provided from the constant register 21b. The readout data is sequentially convolved with the mask data read out from the mask memory 15-1. As a result, the pattern feature data corresponding to the address $a_{8,9}$ of the memory 11 is extracted and stored in the accumulator 13c. This pattern feature data is stored at an address $c_{8,9}$ of the pattern feature memory 17-1.

In this manner, using data stored in the mask memory 15-1, all the data stored in the input pattern data are convolved, and the obtained data are stored in the pattern feature memory 17-1 as the pattern features corresponding to the mask pattern shown in FIG. 3A.

When masking by the mask pattern data stored in the mask memory 15-1 is completed, masking of the input data stored in the memory 11 is then performed again, using the mask pattern data stored in the mask memory 15-2 as shown in FIG. 3B. The results are then stored in the pattern feature memory 17-2.

In the same manner as described above, using the various mask pattern data stored in the mask memories 15-1, . . . , and 15-Q, masking is performed and the various pattern feature data thus obtained are respectively stored in the memories 17-1, . . . , and 17-Q.

Figure 5:
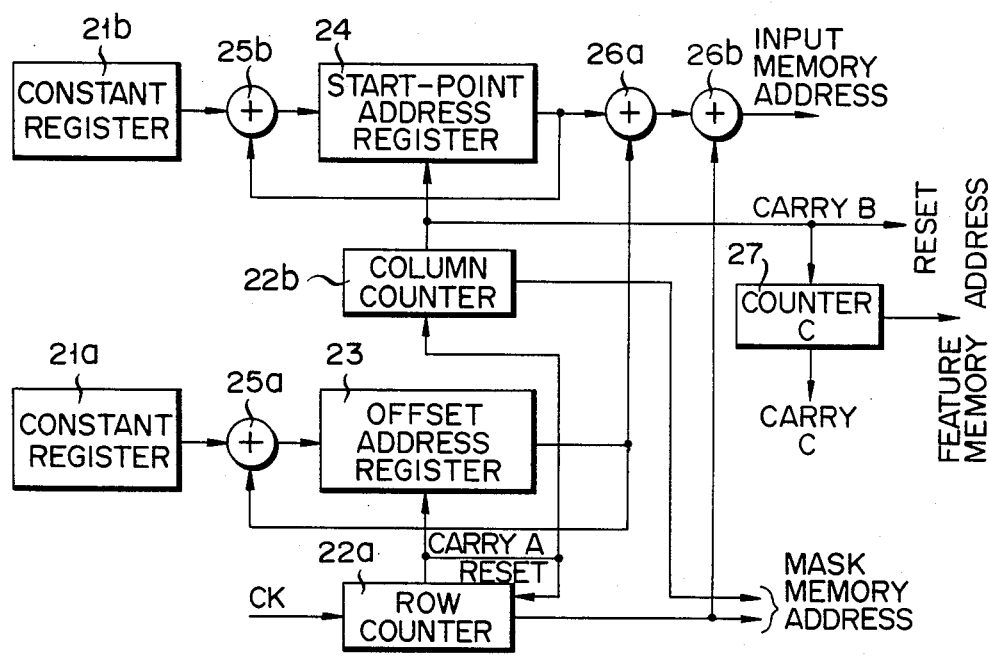
FIG. 5 is a block diagram of an address control unit shown in FIG. 1.
Figures 8A, 8B:
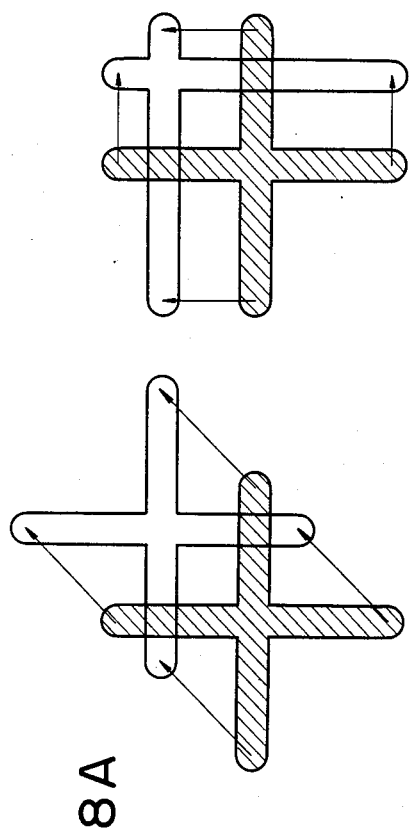
FIGS. 8A and 8B show respectively deformations of an input pattern.
Figure 9:
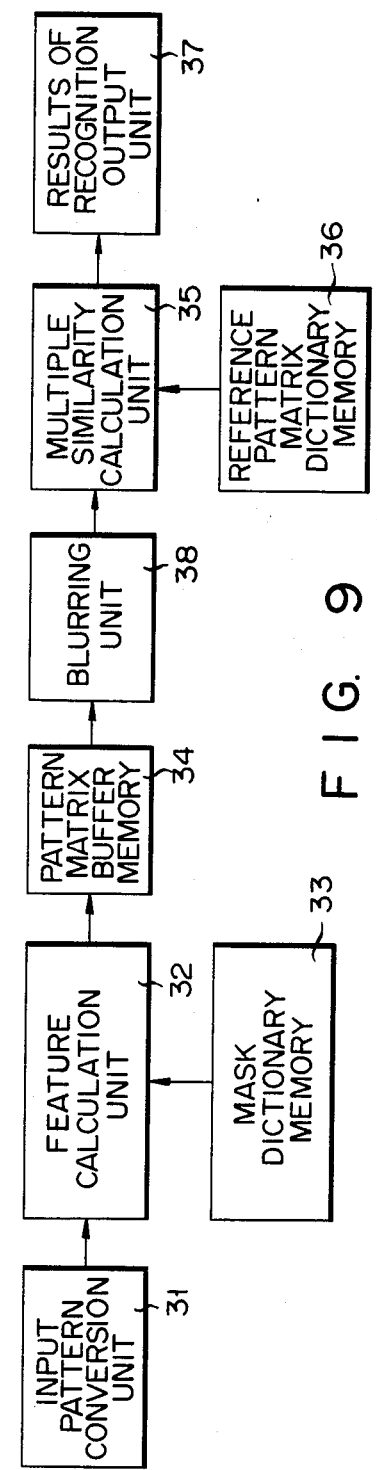
FIG. 9 is a block diagram showing a modification of the pattern recognition system shown in FIG. 6.
Figure 10A:
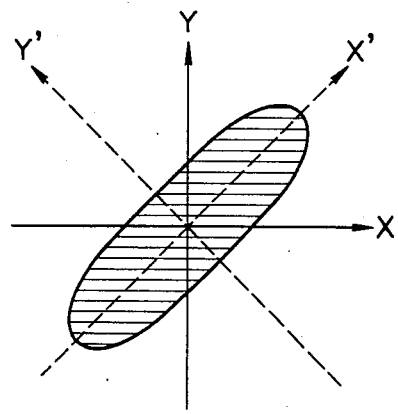
FIGS. 10A and 10B are graphs showing input pattern segments, respectively.
Figure 10B:
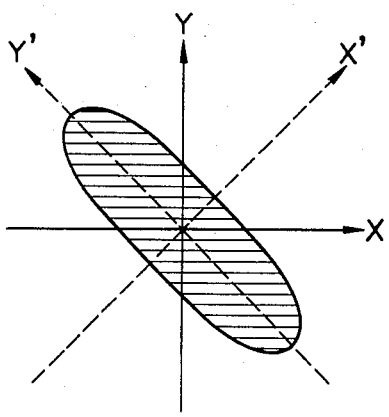
Figure 11:
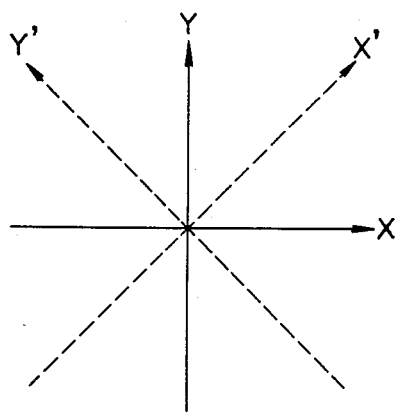
FIG. 11 shows a relationship between two systems of orthogonal coordinates.

The address control unit 12 is arranged in a manner as shown in FIG. 5. The address designation of the mask memories 15-1, . . . , and 15-Q can be performed by a combination of outputs of a row counter 22a and a column counter 22b. The count of the row counter 22a is incremented by one every time it counts a clock CK. The row counter 22a sequentially produces a row address signal for the row of each of the mask memories 15-1, . . . , and 15-Q. In this case, since each of the mask memories 15-1, . . . , and 15-Q has 15 row addresses, the row counter 22a is a scale-of-15 counter. When the count of the row counter 22a is "15" and the row counter 22a receives the next clock CK, the row counter 22a produces a carry signal A and is reset. The carry signal A is then supplied to a count input end of the column counter 22b. The count of the column counter 22b is incremented by one every time it receives the carry signal A from the row counter 22a. The column counter 22b sequentially produces a column address signal for each column of each of the mask memories 15-1, . . . , and 15-Q. In this case, since each of the mask memories 15-1, . . . , and 15-Q has 15 column addresses, the column counter 22b also is a scale-of-15 counter. When all the addresses of one mask memory 15-1 are designated, the column counter 22b produces a carry signal B. This carry signal B is then supplied as a reset signal to the accumulator 13c shown in FIG. 4 and also is supplied to a counter 27 for producing address signals of the memories 17-1, . . . , and 17-Q.

A constant register 21a stores data corresponding to a difference between the number of row data of the input pattern stored in the memory 11 and the number of row of each of the mask memories 15-1, . . . , and 15-Q to skip the outside of 15$\times$15 area. The data in the constant register 21a is supplied to an offset address register 23 through an adder 25a. The address register 23 is set by the carry A of the row counter 22a. The data in the address register 23 is fed back to the adder 25a, so that the difference data is added by the adder 25a to the feedback data from the address register 23. The resultant sum data is then stored in the address register 23 again. An offset data stored in a start-point address register 24 is supplied as an address signal of the input pattern memory 11 through adders 26a and 26b in the order named. The adder 26a adds to the output signal from the register 24 the off-set address output from the register 23 whose count is incremented in response to the carry signal from the row counter 22a. The adder 26b adds to the count of the row counter 20 the signal which is produced by the counter 26a. The data in the start-point address register 24 is added by an adder 25b to a constant delivered from a constant register 21b which stores a given constant for determining a next start address of the memory 11 when one convolution using one of the mask memories 15-1, ..., 15-Q is completed. Therefore, data corresponding to the given position and its peripheral pattern data can be read out from the input pattern memory 11. The addresses of the input pattern memory 11 and each of the mask memory 15-1, 15-2, ..., and 15-Q correspond to each other; when given data is read out at a given address of the pattern memory 11, data is read out at a corresponding address of each of the mask memories 15-1, 15-2, ..., and 15-Q. The carry signal B obtained from the column counter 22b is counted at a counter 27. The content of the counter 27 is used as an address control signal for the pattern feature memories 17-1, 17-2, ..., and 17-Q. The selectors 14 and 16 are controlled by a carry signal C obtained from the counter 27. It should be noted that the accumulator 13c of FIG. 4 is reset by the carry signal B from the column counter 22b. When convolution is completed with respect to all data stored in the memory 11 by using the mask memory 15-1, the obtained features data is stored in the memory 17-1 and memories 15-2 and 17-2 are then selected by the selectors 14 and 16.

According to the address control unit 12 having the arrangement as described above, a given pattern position of the input pattern memory 11 is centered, and the peripheral pattern data is sequentially read out corresponding to the corresponding pattern data of each of the mask memories. These two readout data are then subject to convolution.

According to the present invention, the pattern features can be easily extracted. Furthermore, the pattern features can be stably extracted irrespective of pattern deformation components, thereby providing a variety of industrial applications.

The present invention is not limited to the particular embodiment described above. For example, the sum-of-product operation can be performed by parallel processing, thereby increasing the operation speed. Furthermore, the area of the mask memory which is subject to convolution can be arbitrarily shifted in a stepped manner by varying the constant stored in the constant register 21b. Furthermore, if the mask memory has the same size as the input pattern memory, an inner product operation may be performed in place of convolution as follows:

$$f_{m,n} = \int_{R_\infty} g(r') \cdot P^*_{m,n}(-r', \tau) dr'$$

A case will now be described wherein the input pattern data stored in the input pattern memory 11 is recognized using a plurality of pattern feature data stored in the pattern feature memories 17-1, 17-2, ..., and 17-Q shown in FIG. 1.

There will now be described a patter recognition process hereinafter.

Referring to FIG. 6, an optical signal of an input unknown pattern such as Kanji is photoelectrically converted and is quantized. The quantized data is then stored in the input pattern memory 11 shown in FIG. 1. A feature of mask dictionary 33 corresponds to the mask memories 15-1, ..., and 15-Q shown in FIG. 1. The portion (FIG. 1) excluding the mask memories 15-1, ..., and 15-Q corresponds to a feature calculation unit (i.e., a feature extraction unit) 32.

The input pattern feature data which are obtained by the feature extraction unit 32 are stored in a buffer memory 34 corresponding to the feature pattern memories 17-1, ..., 17-Q. In the buffer memory 34, the feature data obtained from the respective positions in the memory 11 are arranged in the row direction, while the position data of the feature data are arranged in the column direction so as to constitute a feature matrix. Each of the feature vectors of the feature matrix indicating the input pattern is sequentially supplied to a multiple similarity calculation unit 35. The feature vector data is then compared with predetermined dictionary pattern data stored in a reference pattern matrix dictionary 36 so as to obtain a multiple similarity. The similarity data is then supplied to a recognition result editing output section 37, thereby obtaining the recognition result of the input unknown pattern.

The feature data obtained for the respective positions or sub-areas of the input pattern stored in the buffer memory 34 (FIG. 6) are arranged in a feature matrix having the feature data in the row direction and the position data in the column direction. The input pattern data stored in the buffer memory 34 are expressed by the following matrix:

$$F = \begin{pmatrix} f_{11} & f_{12} & \cdots & f_{1Q} \\ f_{21} & f_{22} & \cdots & f_{2Q} \\ \cdot & \cdot & & \cdot \\ \cdot & \cdot & & \cdot \\ \cdot & \cdot & & \cdot \\ f_{R1} & f_{R2} & \cdots & f_{RQ} \end{pmatrix}$$

$$= (f_1, f_2, \cdots f_Q)$$

Each of the feature vectors $f_1, f_2, \ldots, f_Q$ obtained by the above matrix is used for multiple similarity calculation. On the other hand, the reference patterns of the respective categories are stored as feature vectors (processed in the same manner as described above) in the reference pattern matrix dictionary 36. The multiple similarity calculation of, for example, a category (l) is performed between the feature vectors as follows:

$$T^{(l)}[F] = \sum_{q=1}^{Q} \alpha_q \cdot S_q^{(l)}[F]$$

Where, $\alpha_q$ is a weighting factor for the q-th feature and a multiple similarity for the q-th feature is calculated as follows:

$$S_q^{(l)}[F] = \sum_{m=0}^{M} a_{qm}^{(l)} \{(f_q \cdot \phi_{qm}^{(l)})^2 / (\|f_q\|^2 \cdot \|\phi_{qm}\|^2)\}$$

The multiple similarity can be obtained as a sum of partial multiple similarities of the respective feature vectors. The multiple similarity calculation is performed by the multiple similarity calculation unit 35 shown in FIG. 7. The respective vector elements ($f_1$,